Aug. 31, 1937. L. A. CHAMBERS 2,091,267
METHOD OF DECREASING CURD TENSION IN MILK
Filed Dec. 7, 1934
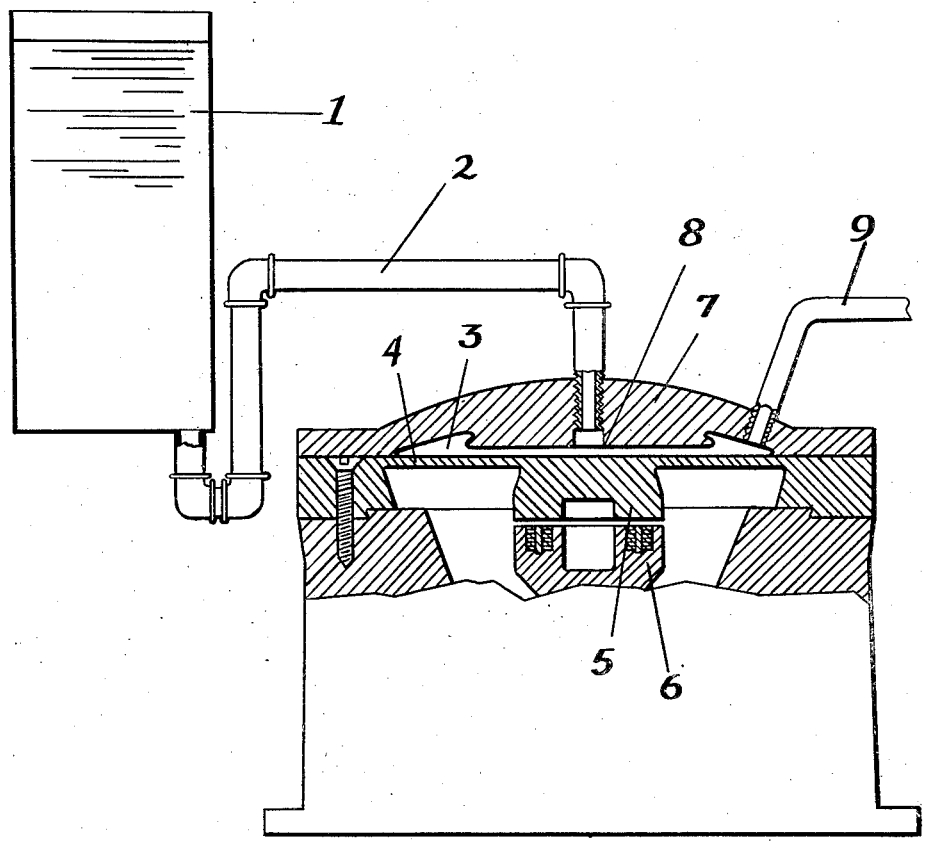
INVENTOR
Leslie A. Chambers
BY Ezekiel Wolf
his ATTORNEY Patented Aug. 31, 1937

2,091,267

UNITED STATES PATENT OFFICE 2,091,267

METHOD OF DECREASING CURD TENSION IN MILK

Leslie A. Chambers, Boston, Mass., assignor to William H. Ashton, Edgemont, Pa.

Application December 7, 1934, Serial No. 756,504

9 Claims. (Cl. 99—60)

The present invention relates particularly to the treatment of milk for the purpose of reducing the curd tension.

Methods previously employed were confined generally to raising the temperature of the milk substantially to the boiling point and boiling the milk for some time, although other methods have been used: such as introducing foreign substances as citrates, lime juice, etc.; filtering the milk through zeolite to adsorb the soluble calcium which is apparently a necessary factor in the coagulation of milk; and by means of pressure homogenization. While this method of reducing the curd tension is satisfactory, there are a number of objections to boiling milk as its constituents are changed by boiling.

The usefulness, on the other hand, of reduction in curd tension has generally been recognized, in particular as providing a more digestible milk. In fact, certain dairies have developed certain herds which have the characteristic of having so-called soft curd milk and this is generally used for certain types of feeding, particularly infant feeding where the digestibility of the milk is an important factor.

The elements or structure that determine whether a milk is a soft curd or a hard curd milk has not, it is believed, been definitely ascertained, but according to the applicant's theory and belief the hardness of the curd or the high tension of the curd is brought about by certain soluble calcium constituents which are sometimes found in smaller or larger quantities in various herds.

It is believed that the action of boiling the milk which brings about a reduction of the curd tension is principally caused by the precipitation of these soluble calcium salts. These precipitates may appear as calcium caseinate or other unsoluble calcium salts which remove therefore the soluble calcium salts and thereby cause a reduction of the curd tension of the milk. The applicant has found that the energy provided in the boiling of the milk to bring about the precipitation of these substances may be similarly effected by the use of vibrational energy in such a manner as to bring about a reduction in curd tension without otherwise affecting the taste or other characteristics of the milk. It has been found that intense vibrational energy is necessary to bring about this result, and in the present invention this vibrational energy is supplied through compressional waves of preferably the sonic range.

In the application of such vibrational energy the applicant has found that it is not necessary to effect a homogenization of the cream with the milk, and therefore the cream line which usually appears at the top of the milk bottle may still be present and at the same time the curd tension materially reduced.

In my joint application filed November 19, 1932, Serial No. 643,518, now Patent 1,992,938, there is disclosed a method of effecting emulsions or suspensions of substances by the use of compressional wave vibrations, and in the companion application of Robert Longfellow Williams, Serial No. 674,020, filed June 2, 1933, there is disclosed a method of homogenizing butter fat in milk by the application of sonic vibrations in causing the milk and cream to flow together between small surfaces one of which is agitated by compressional wave vibrations.

The method in the present application may be effected by apparatus somewhat similar to that shown in the Robert Longfellow Williams application, above referred to, as will appear presently from the description given below.

In the treatment, however, in the present invention the applicant prefers to raise the temperature of the milk to a heat that is usually used in pasteurization. In this way the reduction in curd tension takes place more rapidly with perhaps a less supply of vibrational energy than would otherwise be necessary, and in addition the heating of the milk conforms to the systems usually employed in dairies where pasteurization takes place before the milk is put up for sale.

The present invention will be more fully disclosed in connection with the drawing attached hereto.

The milk to be treated is heated in a heating tank 1 and to a temperature of approximately the point of pasteurization which is 50 degrees or 55 degrees centigrade. The milk then flows through a pipe 2 into the chamber 3 one face of which is formed with the diaphragm 4 which is vibrated by the magnetic system 5, 6 similarly as shown in the application to Robert Longfellow Williams, Serial No. 674,020, referred to above. The chamber 3 may be formed with a cover 7 and be provided with a flat surface 8 which is not placed as closely to the diaphragm as the nozzle described in the above application. The space between the surface 8 and the diaphragm may be approximately a sixteenth of an inch, or greater, and should preferably provide a free passage so that no static pressure is built up on the milk passing over the diaphragm.

The milk flows over the surface of the diaphragm 4 and out through the outlet pipe 9, although it may be made to flow in the opposite direction in which case the tank 1 would be connected with the pipe 9.

In the operation of the present system I have found that in the apparatus, as above described, with a constant velocity of flow of about 250 gallons per hour and a constant frequency of about 360 cycles per second that the reduction in curd tension increases at about the rate of 1% for every 30 watts of power applied to the oscillator and that, therefore, for a curd tension reduction of 60% there should be about 1800 watts applied. Since the oscillator efficiency is about 50%, this means an actual application of about 1 kilowatt of power for a curd tension reduction of 60%.

Soft curd milk is usually considered milk in which the curd tension is below 30 grams by the Hill test. Hard curd milk is milk which tests above 60 grams. Ordinary milk is usually found to have a curd tension from 40 to 100 grams. A milk which has a curd tension from 20 to 25 grams is satisfactory for most purposes so that approximately 1 kilowatt of actual power must be applied to obtain this result.

Having now described my invention, I claim:

1. A method of reducing the curd tension in hard curd milk which comprises subjecting the milk to intense compressional wave vibrations.

2. A method of reducing the curd tension in hard curd milk which comprises flowing the milk over a source of compressional wave vibrations of intense nature, thereby subjecting the milk to such vibrations.

3. A method of reducing the curd tension in hard curd milk which comprises flowing the milk over a substantially unimpeded passage having a source of compressional wave vibrations of intense nature.

4. A method of reducing the curd tension in hard curd milk which comprises flowing the milk over a substantially unimpeded passage having a source of compressional wave vibrations of intense nature within the low sonic range.

5. A method of reducing the curd tension in hard curd milk which comprises flowing the milk over a substantially unimpeded passage having a source of compressional wave vibrations of intense nature approximately 600 cycles per second.

6. A method of reducing the curd tension in hard curd milk which comprises heating the milk to a temperature about fifty degrees centigrade and then passing the same over a source of intense vibrations of compressional waves, thereby subjecting the milk to such vibrations.

7. A method of reducing the curd tension in hard curd milk which comprises heating the milk to a temperature about fifty degrees centigrade and subjecting it to intense vibrations of compressional waves.

8. A method of reducing the curd tension in hard curd milk which comprises heating the milk to a temperature about fifty degrees centigrade and subjecting the milk to intense vibrations of compressional waves of about 600 cycles or less.

9. A method of reducing the curd tension in hard curd milk without homogenization of the cream which comprises subjecting the milk to compressional wave vibrations of great intensity under unrestrained pressure conditions.

LESLIE A. CHAMBERS.